United States Patent [19]
Wood

[11] Patent Number: 6,141,141
[45] Date of Patent: Oct. 31, 2000

[54] SINGLE SIDEBAND MODULATORS

[75] Inventor: Nigel R Wood, Brackley, United Kingdom

[73] Assignee: Marconi Communications Limited, United Kingdom

[21] Appl. No.: 09/020,568

[22] Filed: Jan. 23, 1998

[30] Foreign Application Priority Data

Jan. 24, 1997 [GB] United Kingdom .................... 9701504

[51] Int. Cl.[7] ..................................................... G02F 2/02
[52] U.S. Cl. ................................................................ 359/326
[58] Field of Search ..................................... 359/326–332

[56] References Cited

U.S. PATENT DOCUMENTS

| | | | |
|---|---|---|---|
| 4,904,038 | 2/1990 | Chang ................................. | 359/326 X |
| 5,022,732 | 6/1991 | Engan et al. ........................ | 359/326 X |
| 5,265,112 | 11/1993 | Noll et al. .................................. | 372/32 |
| 5,734,493 | 3/1998 | Jopson ..................................... | 359/326 |
| 6,008,931 | 12/1999 | Von Helmolt et al. ................. | 359/326 |
| 6,034,760 | 3/2000 | Rees ....................................... | 356/28.5 |

FOREIGN PATENT DOCUMENTS 2 131 567  6/1984  United Kingdom .
2 142 796  1/1985  United Kingdom .

*Primary Examiner*—John D. Lee
*Attorney, Agent, or Firm*—Kirschstein, et al.

[57] ABSTRACT

An optical reference frequency generator comprises a plurality of Single Sideband Optical Frequency Shifters (SSB-OFS) wherein the SSB-OFSs are connected in pairs, each pair having a common optical frequency input and an optical shift frequency input arranged so that the output from one SSB-OFS of each pair has a positive frequency shift and the output from the other SSB-OFS has a negative frequency shift.

5 Claims, 11 Drawing Sheets

LOCATION (A)

LOCATION (B)

LOCATION (C)

LOCATION (D)

SINGLE SIDEBAND MODULATORS

BACKGROUND OF THE INVENTION

SINGLE SIDEBAND MODULATORS

The present invention relates to the use of Single-Sideband (SSB) optical modulators, acting as electrically tuneable optical frequency shifters, to produce an optical reference comb (evenly or unevenly spaced) for use in low channel spacing High Density Wave Division Multiplexer (HDWDM) and coherent based systems. The use of SSB optical modulators is extended to the point where it is possible to eliminate (or reduce the number of) tuneable lasers required in such systems.

U.S. Pat. No. 5,265,112 uses SSB optical modulators to generate optical reference combs but does not cover the issue of how to uniquely identify one reference comb line from another. This is a serious issue in very narrow channel spacing systems with typical channel spacing of several GHz as there is the inherent risk of selecting an incorrect reference line. The present invention covers a technique which does allow a reference comb to be generated in which all the individual lines are uniquely identifiable.

Also is described the ability of SSB optical modulators to act as an electrically tuneable optical frequency shifter in firstly generating an even or unevenly spaced optical reference comb, with each reference line being uniquely identifiable, which can be used to stabilize the inter-channel separation between transmitters within multi-channel HDWDM or coherent based systems. Secondly, to replace the coherent transmitters' laser within localized and distributed multi-channel coherent based systems. Thirdly, to replace both the transmitter's and local oscillator's laser in both localized and distributed multi-channel coherent based systems.

GEC-Marconi Materials Technology Ltd—Caswell reported the first practical realization of an integrated optic Single-Sideband (SSB) optical modulator in 1993 which is shown in FIGS. 1a and 1b. The device, fabricated in GaAs, uses the concept described theoretically by Désormière et al in "An Integrated Optical Frequency Translator for Microwave Frequency Operation" Journal of Lightwave Technology, No. 8 (1990) pp 506–513. The key element within the design is a Y-fed electro-optic directional coupler 1, whose electrode structure carries a travelling microwave signal. Since the coupler is excited 1 symmetrically by the Y-branch, in the absence of a modulating RF wave the optical distribution at the output of the coupler is also symmetric. If the two opposite halves of this distribution are sampled in output waveguides and then summed out of phase in a Mach-Zehnder interferometer section, the optical output of the device will accordingly be zero. This provides the carrier suppression feature of this device.

When a modulating signal RF is applied to the electrodes, mode-coupling can take place between the symmetric and antisymmetric modes. Since an output interferometer 2 is set to add opposite sides of the incoming light distribution in anti-phase, the antisymmetric components add to form a signal in an output waveguide. The signal frequency will be equal to that of the RF signal applied. Because of the carrier suppression feature the resulting output is a single frequency output equal in frequency to the carrier frequency shifted by a frequency equal to the RF modulation signal. Selecting whether the SSB modulator selects the Real or Image signal side allows positive or negative optical frequency shifters to be constructed.

The present invention relates to the uses of these SSB based optical frequency shifters within multi-channel optical systems highlighting their use in reducing, significantly, the number of lasers required. This method in eliminating the optical frequency control problems associated with all multi-channel coherent systems.

In multi-channel HDWDM or coherent based OFDM (Optical Frequency Division Multiplexed) systems there is the requirement to stabilize the inter-channel spacing between transmitters, avoiding cross-channel interference. Traditionally, Wavelength Management Units (WMU), consisting of an optical frequency scanning system, are used to scan the comb of wavelengths formed by combining the transmitters, measuring and hence controlling their inter-channel separation. Although every effort has been made to reduce the scan times, a compromise has to be made in the level of wavelength stability achievable, as the stability achievable is inversely proportional to the time interval between corrections. That is, shorter the interval is between scans, and hence correction, higher the repetition of frequency corrections and hence higher the optical frequency stability achieved. Also, in multi-channel systems, consisting of several 10's or 100's of channels, there is the practical problem of bringing into service these number of channels simultaneously, being able to identify each channel uniquely, and hence, the ability to determine the to unique frequency correction for each channel. Usually, this leaves the system designer to either start one or two channels up at a time (spaced sufficiently in optical frequency to allow unique identification) or to use multiple WMUs, each controlling a fraction of the total system. Even with multiple WMU systems start-up times could vary from several 10's of minutes to several hours.

Eliminating the WMU and placing the optical frequency control problem with the coherent transmitters themselves would seem to be an ideal solution as they would act independently and in parallel. Because each transmitter would be self controlling, the requirement to wait for 'your turn' to be brought into service is eliminated resulting in system start-up times being limited only by the 'slowest' transmitter (the transmitter having the largest optical frequency correction, i.e. the correction of start-up frequency to its allocated channel frequency). This would reduce system start-up times to several seconds not minutes or hours.

The practical way of implementing transmitter self frequency control is to tune the transmitter's laser to an optical wavelength reference, positioned in wavelength for the required channel using the same Automatic Frequency Control (AFC) approach as is used to lock the LO laser to one of transmitter's within the coherent receiver as described in U.S. Pat. No. 5,461,504. These optical wavelength references have been of interest for several years. Current techniques for generating suitable useable references include locking to a molecular absorption line of a gas, such as Acetylene, or the emission line of an ionized gas. Although, these techniques have been used to generate several 10's of useable reference wavelengths the large separation between features, usually 30–80 GHz, make their use restricted. Other techniques include modulating an FP laser or use of an SSB modulator in a circulating loop configuration as described in U.S. Pat. No. 5,265,112.

All of these types of comb generators suffer from the same problem—the inability to uniquely identify one reference line from another. This increases the risk of a transmitter locking to the wrong reference and hence sitting at the wrong channel. To avoid this situation supervisory system (possible based on a WMU) would be required to monitor and supervise the transmitters, checking for correct locking. The drawback is this would increase the start-up time again.

SUMMARY OF THE INVENTION

According to the present invention there is provided an optical reference frequency generator comprising a plurality of Single Sideband Optical Frequency Shifters (SSB-OFS) wherein the SSB-OFSs are connected in pairs, each pair having a common optical frequency input and an optical shift frequency input arranged so that the output from one SSB-OFS of each pair has a positive frequency shift and the output from the other SSB-OFS has a negative frequency shift.

There is further provided an optical reference comb generator comprising an optical reference frequency generator as above, wherein each SSB-OFS output is connected to the inputs of a further pair of the plurality, each further pair having respective optical shift frequency inputs.

There is also provided a coherent receiver having Homodyne or Heterodyne detection where the local oscillator is an optical reference frequency generator as above.

BRIEF DESCRIPTION OF THE DRAWINGS

The present invention will now be described with reference to the accompanying drawings, in which:

FIG. 1b shows a schematic diagram of the device of FIG. 1a;

FIG. 3b schematic of the SSB-OFS building block of FIG. 3a;

DETAILED DESCRIPTION OF THE PREFERRED EMBODIMENTS

Figure 1A:
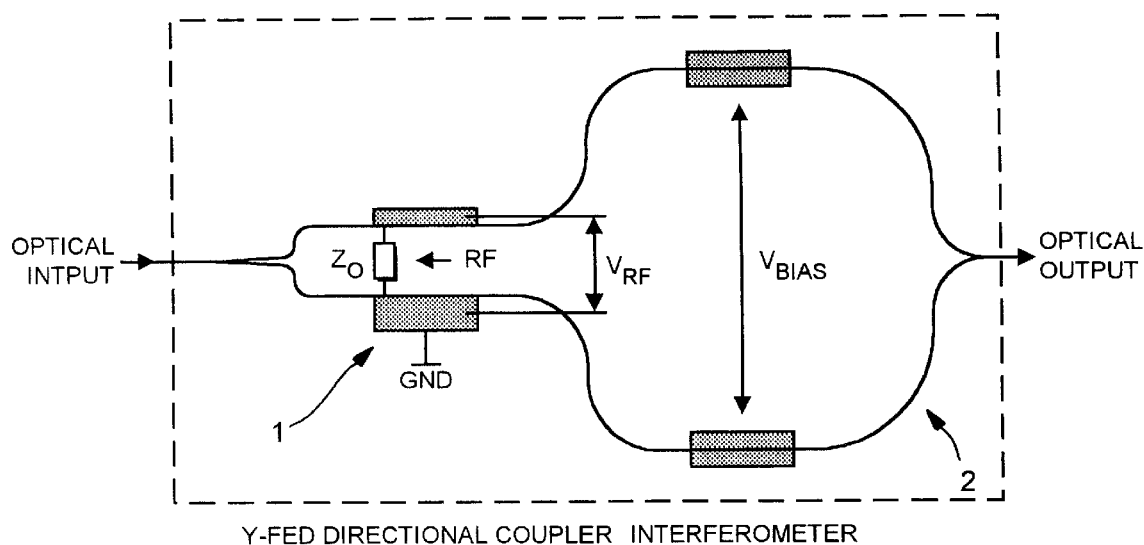
FIG. 1a shows a practical example of a Single Sideband (SSB) Modulator Device.
Figure 1B:
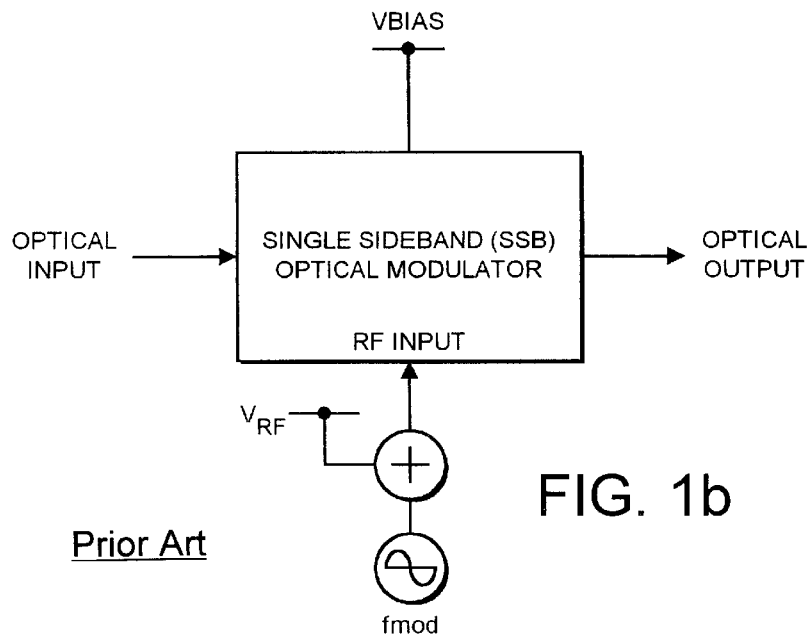
Figure 2:
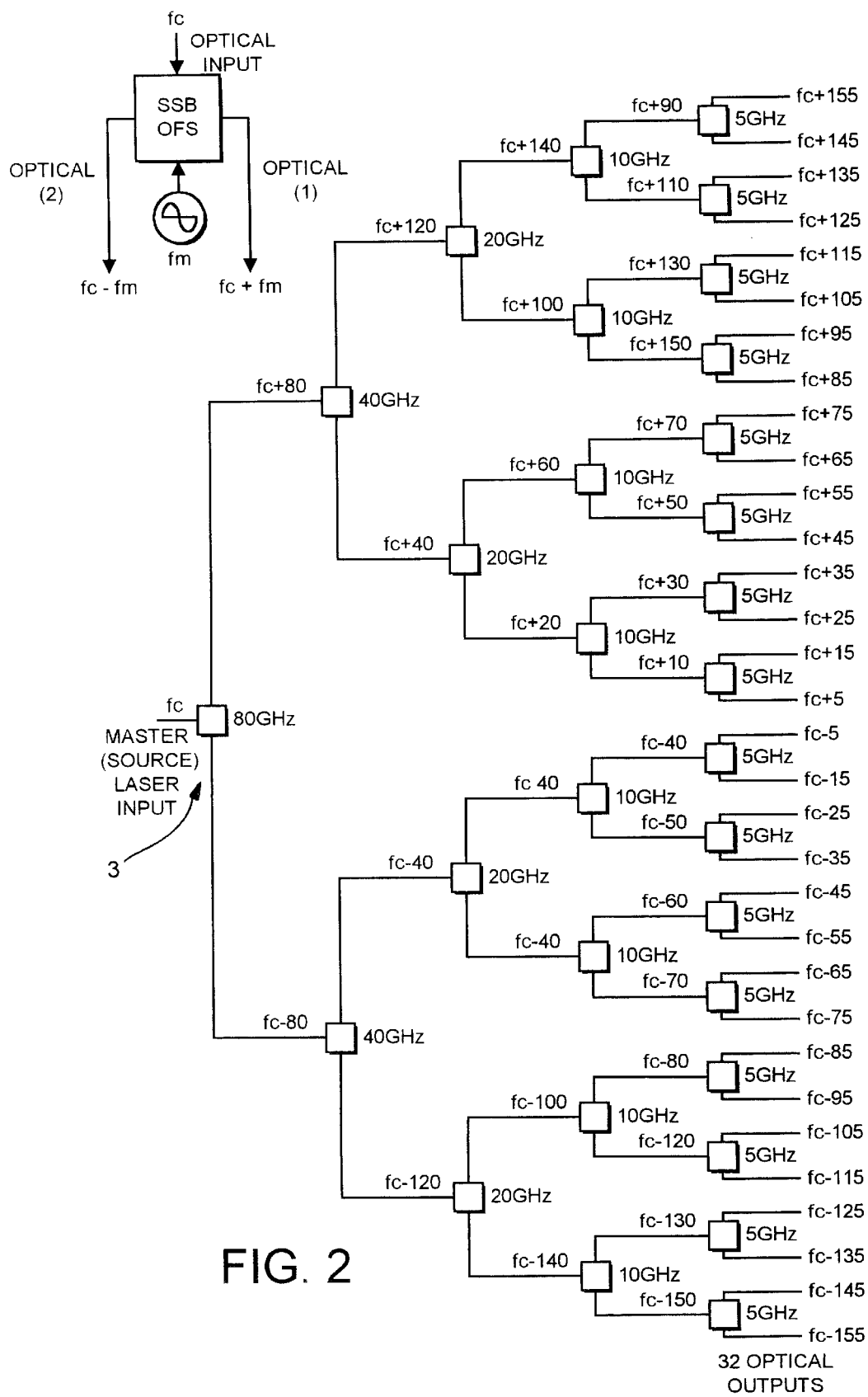
FIG. 2 shows a schematic representative of a 32 Reference Line Comb Generator with a channel spacing of 10 GHz.

What is required is a very stable, evenly spaced optical reference comb in which each reference line is uniquely identifiable. It is with the advent of SSB Optical Modulator based Optical Frequency Shifters (SSB-OFSs) that practical optical frequency combs can be generated. FIG. 2 highlights the use of multiple SSB-OFSs to produce a 32 channel 'binary division tree' based reference comb with an inter-channel separation of 10 GHz. As shown, the optical signal is derived from a single master laser 3 which is either stabilized using molecular line locking or left to free run. The absence of frequency control of the master laser 3 does not degrade the system's performance. As the master laser 3 drifts the optical frequency comb would follow, and hence, the transmitters, and in turn the receivers, all tracking the master laser's drifting. To allow unique identification of each reference line the end set of SSB-OFS have a binary ID code mixed with the RF modulation signal. This signal is detected by the coherent transmitter, which consists of a reduced functionality coherent receiver where the coherent transmitter's laser acts as a local LO laser.

Figure 3A:
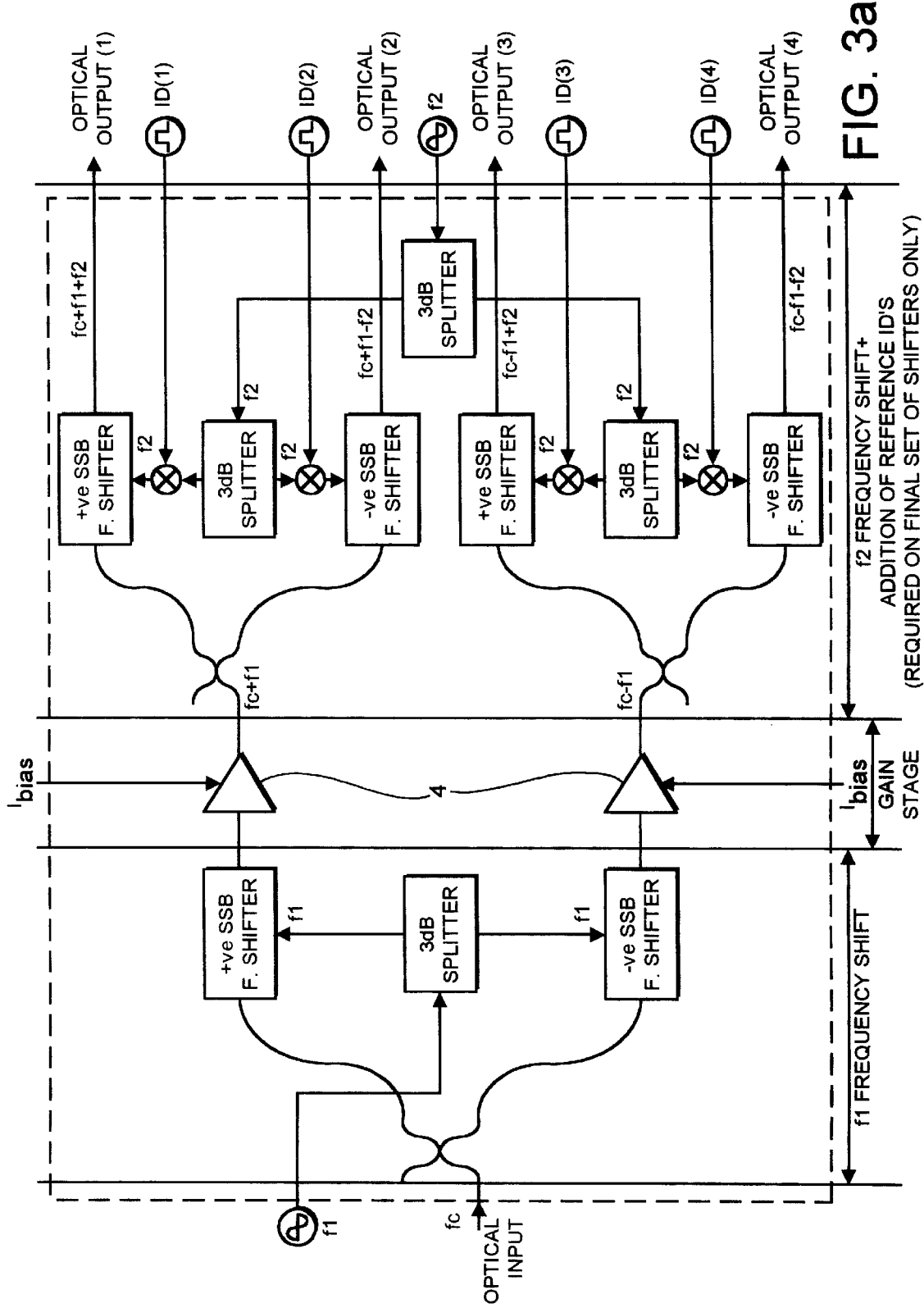
FIG. 3a shows a SSB Optical Frequency Shifter (SSB-OFS) building block with 4 outputs using 6 SSB-OFSs and two Semiconductor Optical Amplifiers (SOAs)
Figure 3B:
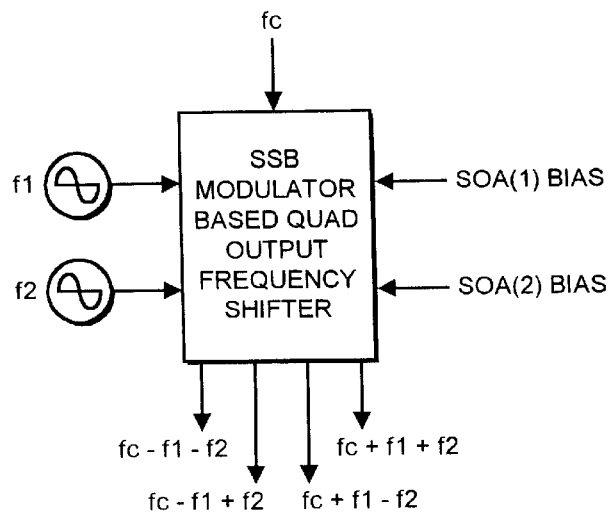

The number of SSB-OFS required in a given system is equal to $2^{N+1}-2$, where N is the number of stages required and is equal to $\log_2$ (No of channels). For a system with 32 channels and 10 GHz channel separation the number of stages required would be 5 and the number of modulators is 62. Due to the inherent losses of the SSB-OFS and the large optical split required, due to taking the signal from the one master laser, the use of inter-stage optical amplification is required. FIGS. 3a and 3b show a basic building block that can be used to form a complete frequency comb system with 0 dB loss between the master laser and each reference output. The basic building block consists of 6 SSB-OFSs implemented with an equal number of positive and negative frequency shifters. The inclusion of a pair of semiconductor optical amplifiers (SOAs) 4 between the first and second stages allow the losses of the complete Opto-Electronic Integrated Circuit (OEIC) to be reduced to zero, that is the optical gain of the amplifiers is set to equal the total optical loss of the OEIC.

In FIGS. 3a and 3b the two RF frequencies ($f1$ and $f2$) determine the spacing of the Four (4) reference lines generated. Due to the combinations of addition and substraction of the two RF frequencies ($f1$ and $f2$) with the carrier frequency ($fc$), sourced from the master or seed laser, the four reference lines generated are: $fc-f1-f2$, $fc-f1+f2$, $fc+f1-f2$ and $fc+f1+f2$. Therefore, if $f1=100$ GHz and $f2=20$ GHz the reference lies produced will be: $fc+10$ GHz, $fc-10$ GHz and $fc+30$ GHz—which results in a 4 line reference comb with 20 GHz channel spacing.

By suitable choice of RF frequencies an even or uneven spacing can be achieved.

Figure 4:
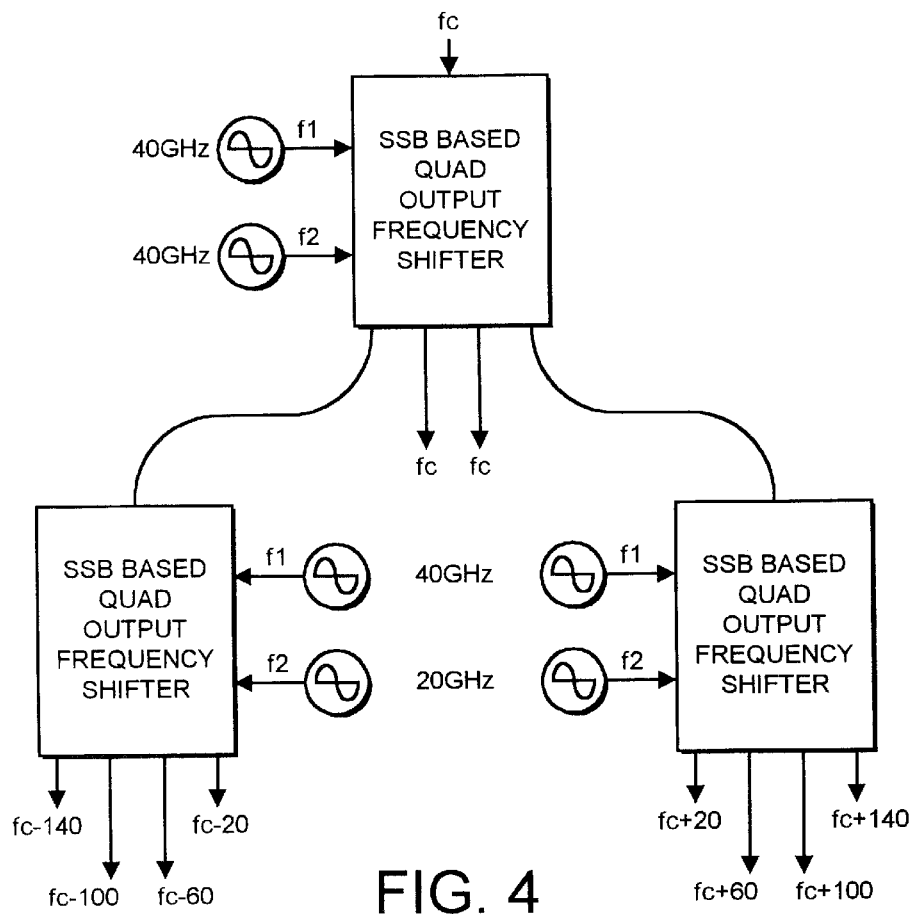
FIG. 4 illustrates the use of the SSB building block of FIGS. 3a and 3b to form an 8 line reference comb.

Using this building block the optical reference comb generator for a 32 channel system with a 10 GHz separation can be reduced to 11 separate blocks configured in 3 stages (FIG. 4). It should be noted that if the two modulation frequencies $f1$ and $f2$ frequency shifts can be accomplished or for larger shifts several SSB-OFS can be concatenated— allowing several THZ to be covered with the use of several 10's of SSB-OFS based building blocks.

The use of SSB optical modulators in forming optical frequency shifters, combined with inter-stage optical amplification, makes it possible to produce large optical reference combs covering several TBZ with very low optical losses. In multi-channel coherent based distribution systems the coherent transmitters are co-located at a centralized head-end. In effect they form a well stabilized (by locking to reference comb), uniquely identifiable reference comb in which each 'reference line' instead of carrying an ID binary code transmits the data (or video encoded data) to be distributed. It can, therefore, be deduced that the need to supply both the optical reference comb and the coherent transmitters is unnecessary as the SSB-OFS based reference comb generator can be used as the coherent transmitters comb. Thus, both the system complexity and the system costs can be reduced significantly, as most of the cost of such systems is normally dominated by the cost of the WMU and the associated control interfaces.

As seen the SSB-OFS have been used to replace the coherent transmitters in localized coherent based distribution systems. The SSB-OFS can also be used to produce a tuneable local Oscillator (LO) for use in coherent based receivers.

Figure 5:
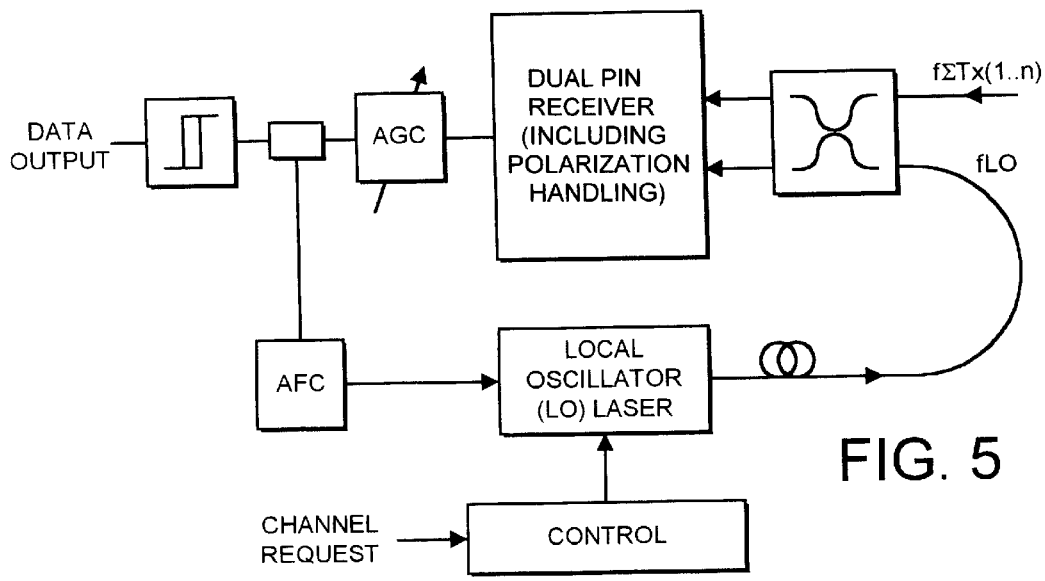
FIG. 5 illustrates a Standard Coherent Receiver.
Figure 6B:
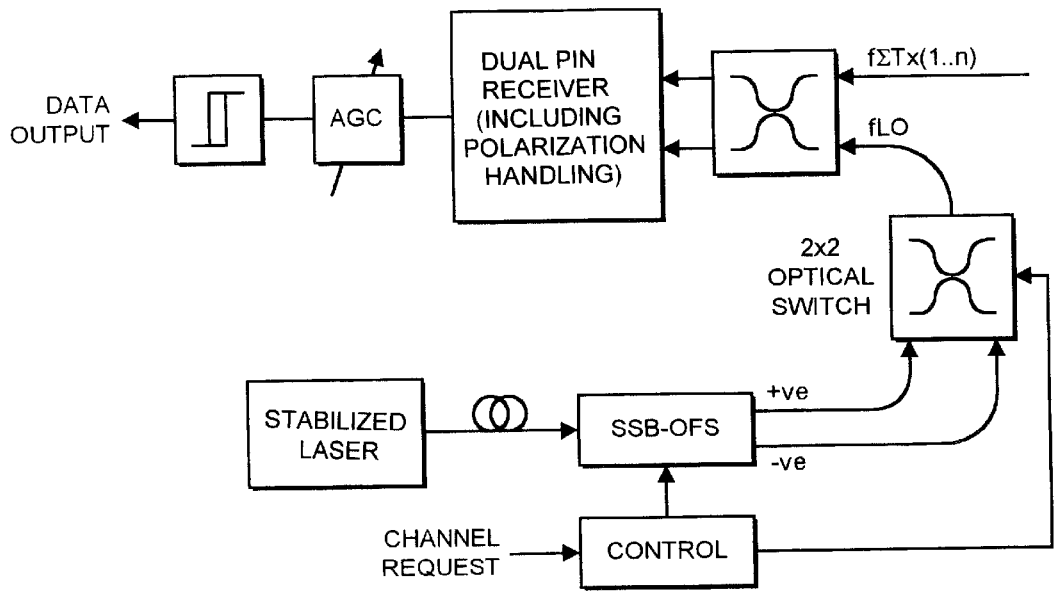
FIG. 6b shows a schematic of a coherent receiver using SSB-OFSs and a single IF stage plus optical switch to select a positive or negative frequency shifted LO signal.
Figure 6A:
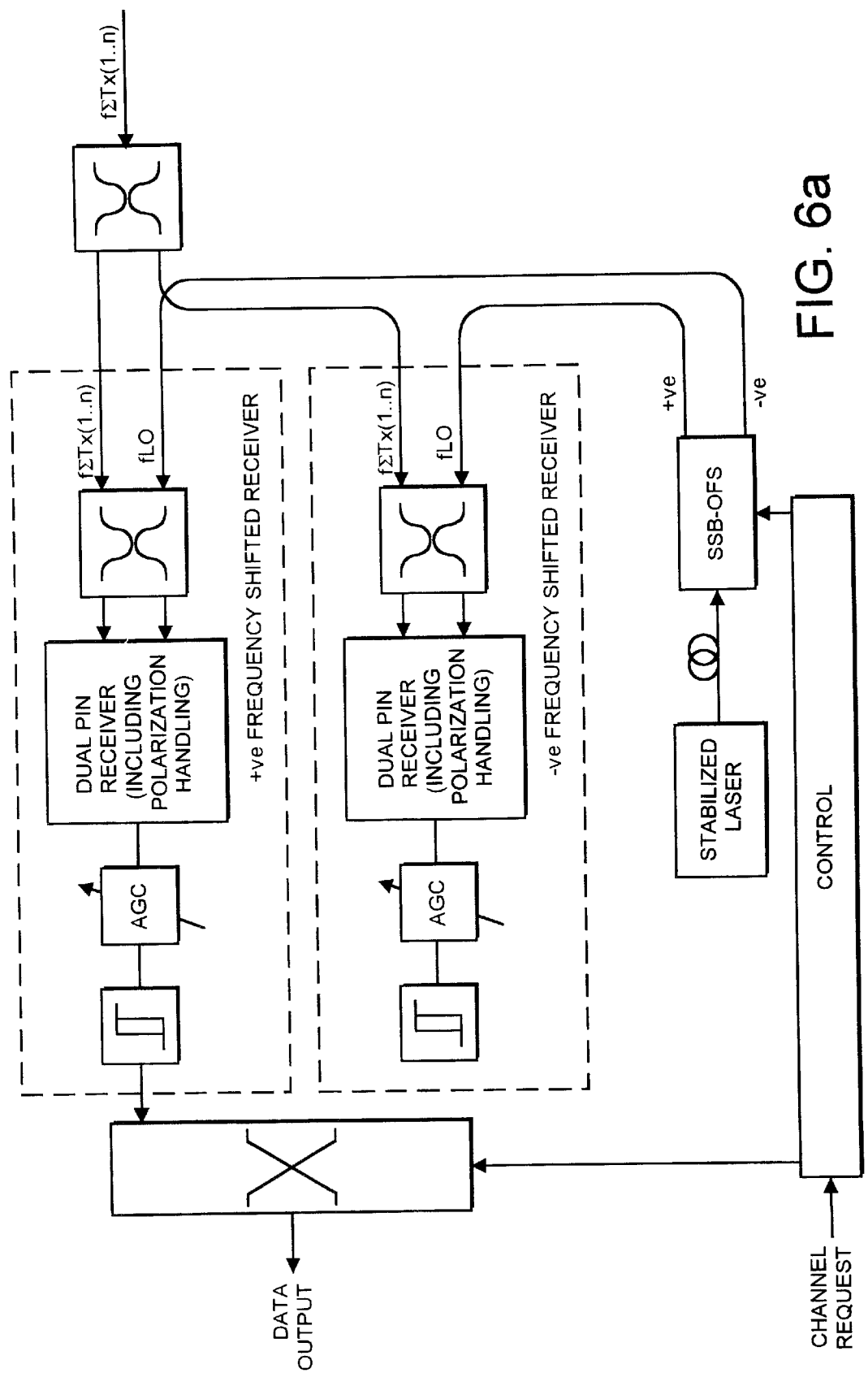
FIG. 6a is a schematic of a coherent receiver using SSB-OFSs and two IF stages plus an electrical multiplexer to select positive or negative frequency shifted LO signal.
Figure 7A:
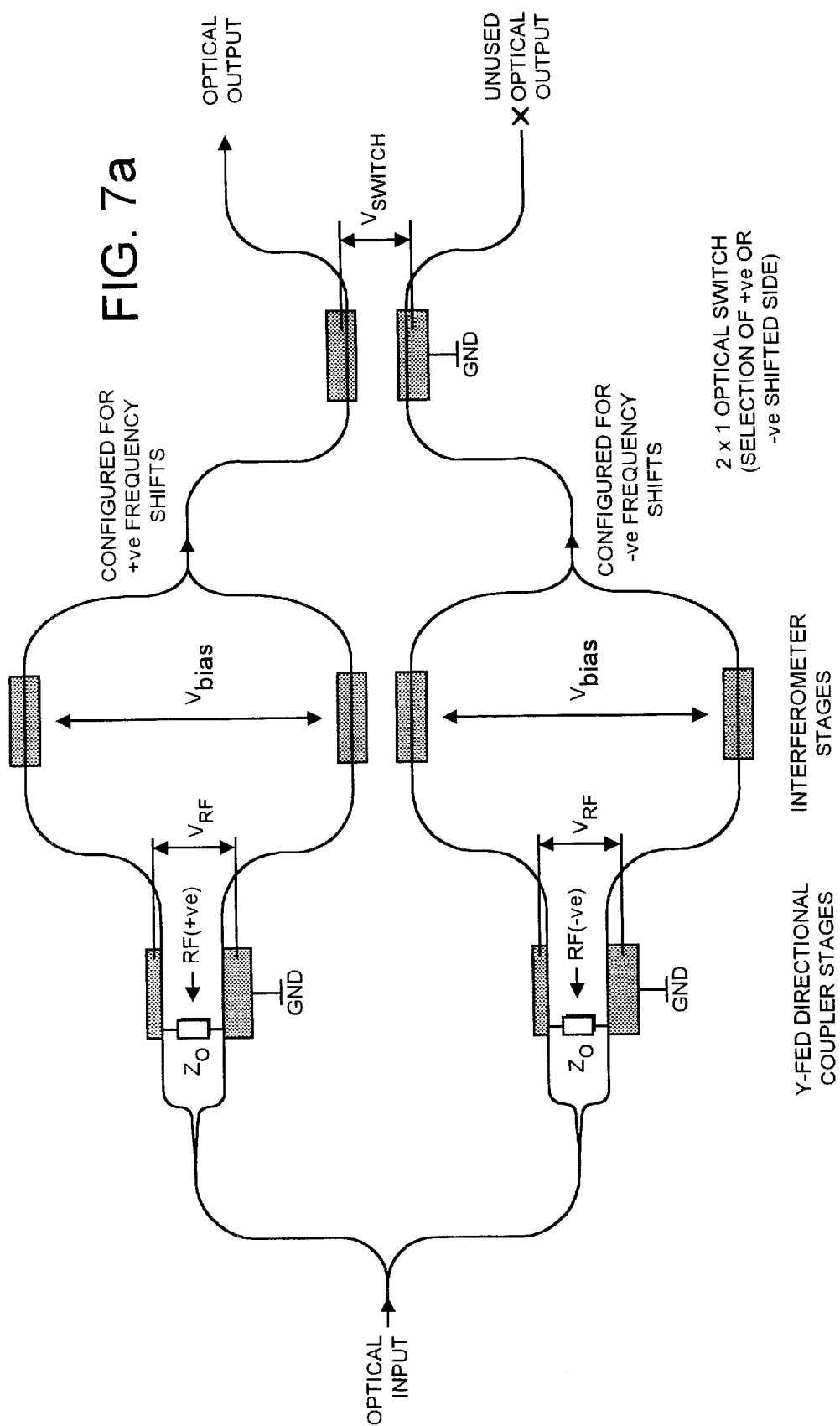
FIG. 7a shows an extended SSB-OFS block diagram including an optical switch function to allow selection of either the positive or negative frequency shifted output.
Figure 7B:
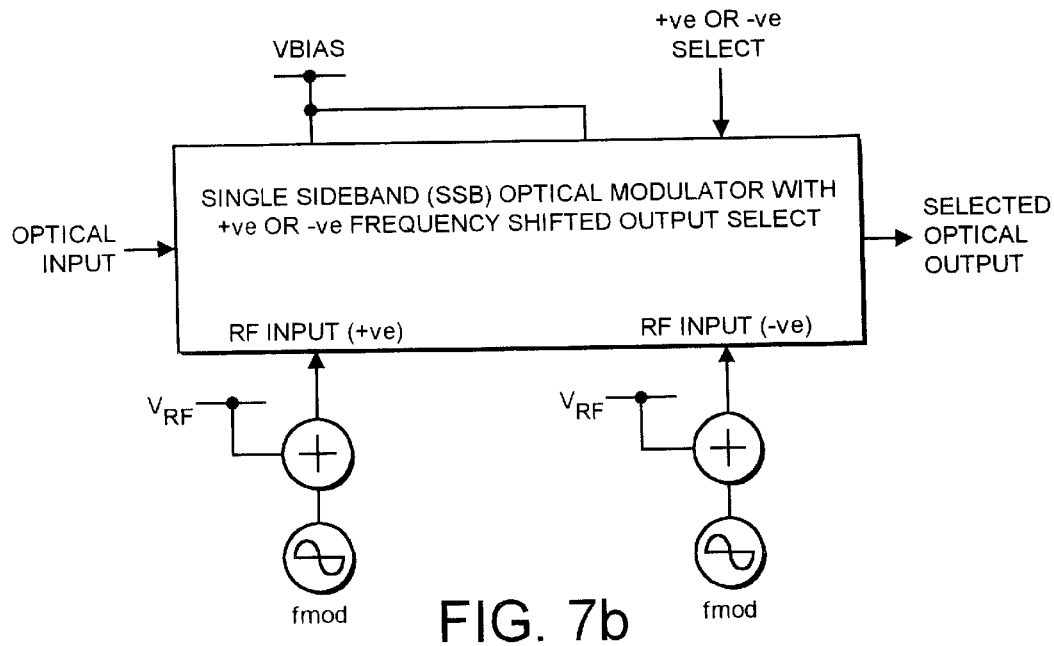
FIG. 7b shows a schematic of a selectable SSB-OFS.
Figure 8:
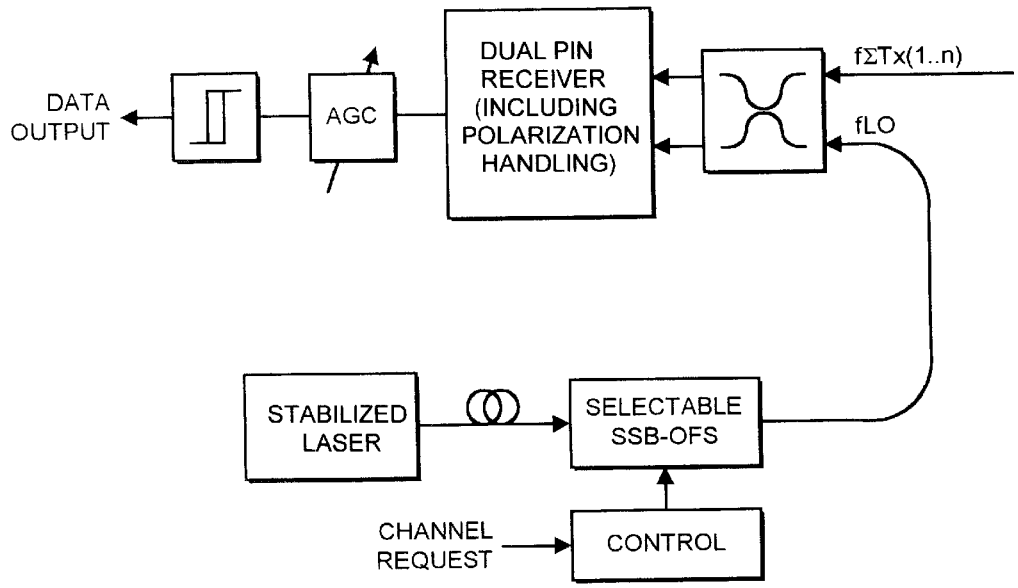
FIG. 8 shows a Coherent Receiver using the selectable SSB-OFS of FIGS. 7a and 7b.
Figure 9:
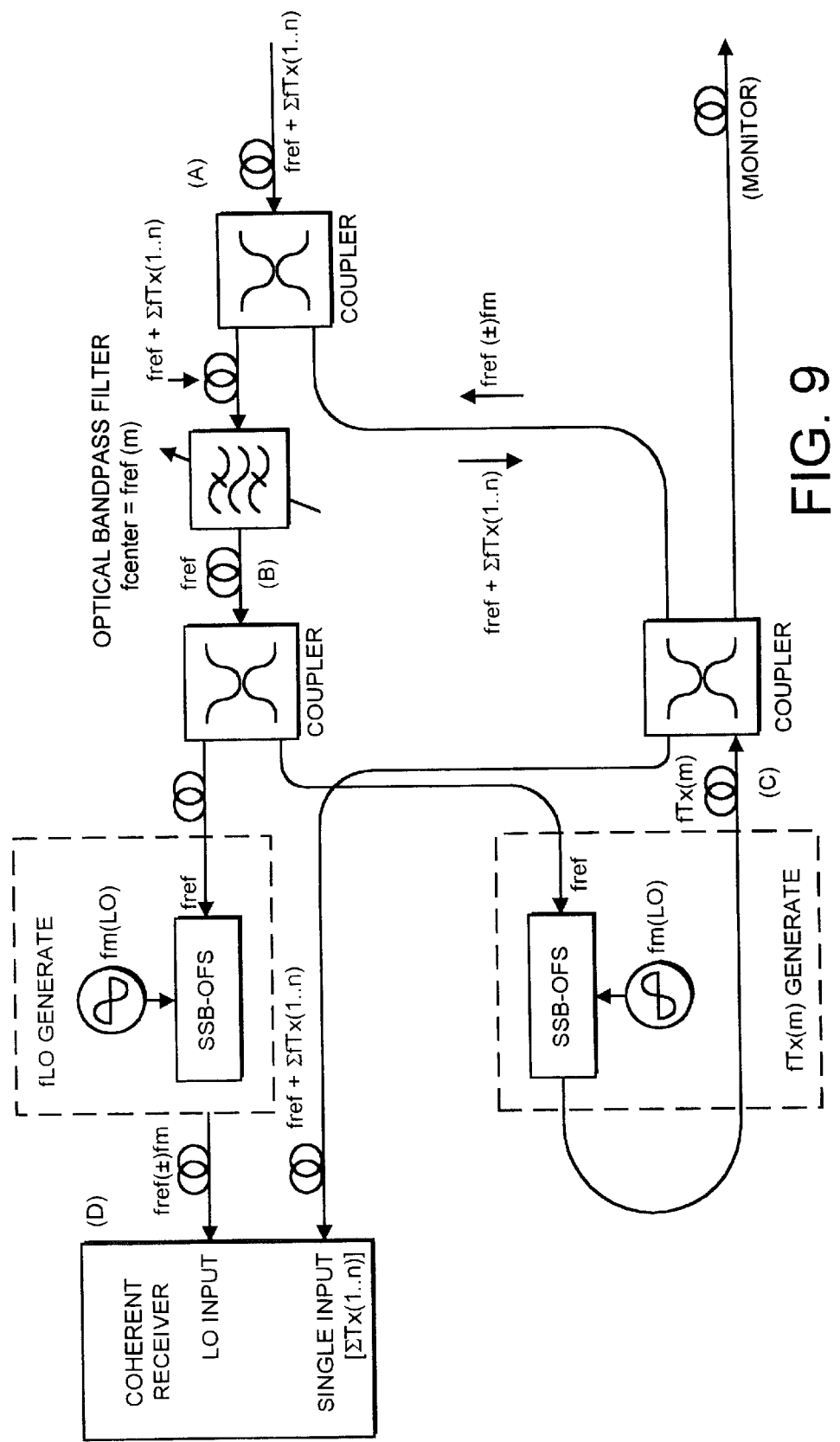
FIG. 9 shows a schematic of a simplified Coherent Transceiver using SSB-OFS.
Figure 9A:
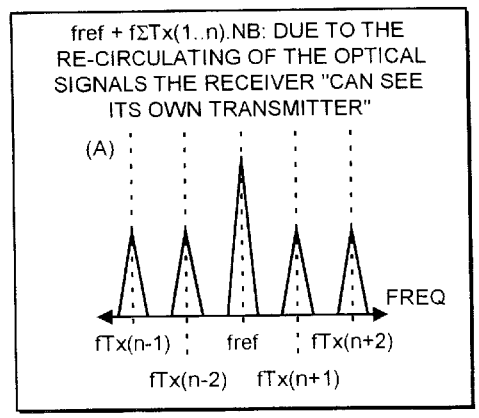
FIGS. 9a–9d show the optical signals present and their respective frequency positions as identified by references [A]–[D] in FIG. 9.
Figure 9B:
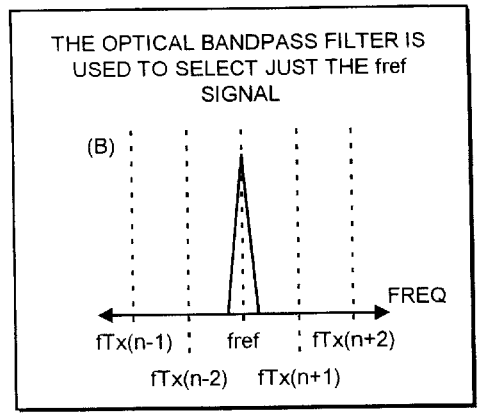
Figure 9C:
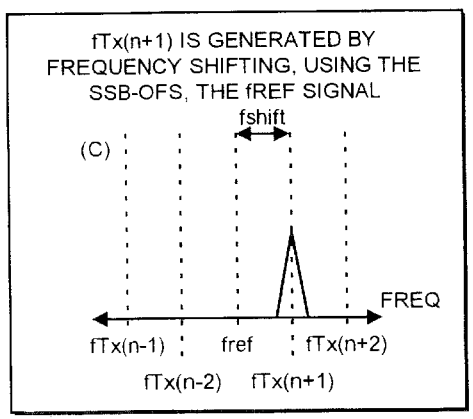
Figure 9D:
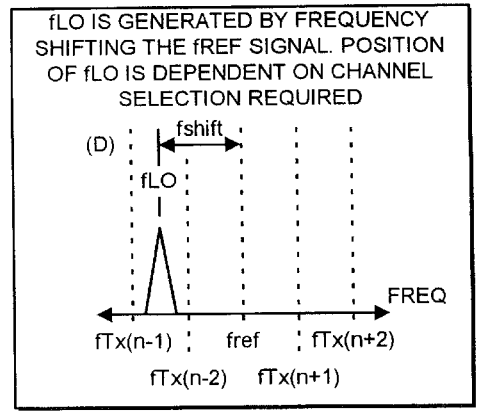

As each coherent receiver in FIG. 5 contains a Local Oscillator (LO) laser tuneable over the wavelength band of all the channels, it is in effect a tuneable optical reference. In FIGS. 6a and 6b the LO is replaced by a pair of SSB-OFSs. Tuning of the now 'Electro-Frequency-Tuneable' (EFT) LO is accomplished by sweeping the two RF signals feeding the SSB modulators. A master LO laser now acts as the common LO laser supplying the optical power and defining the central optical frequency. The LO laser is stabilized in the same way as the master transmit laser located at the head-end. Indeed, there is no reason why the same laser could not be used for both the transmitter and receiver section's master laser. This could mean that a 1000 channel coherent based switch could, theoretically, be generated from a single laser eliminating the cost of selecting 2000+ (close performance) matched lasers.

Due to the SSB-OFS being able to be configured to produce either positive or negative frequency shifts the use of a dual SSB-OFS configuration is required to fully implement a coherent receiver or Electro-Frequency-Tuneable Coherent Optical Receiver (EFTCO-Rx). The EFTCO-Rx would be a very much simplified version of a standard coherent receiver. The need to implement Automatic Frequency Control (AFC), used to maintain the LO in lock with the desired channel is eliminated (due to the regular spacing of the coherent transmitters). Also, the tuning characteristics of the tuneable RF sources (VCO-Voltage Controlled Oscillators) are well defined, no mode jumps, no uneven frequency steps/jumps (due to thermal over-shoot or under-shoot), so the EFT-LO tuning algorithm is reduced to a very simple look-up table. The key to the look-up table would be a channel request, which would point to the voltage to be applied to the VCOs to produce the required RF modulation, signal fed to the SSB modulators. A digital signal would also indicate whether to use the recovered signal from the positive or negative side of EFTCO Rx.

The use of coherent techniques to form very large optical switch matrixes has been of interest especially in producing an easily re-configurable Main Distribution Frame, normally located in the basement of most exchanges as referred to in U.S. Pat. No. 5,461,504. If the technique described above is used to eliminate the coherent transmitters within such coherent based switch matrixes the same set of advantages are obtained.

Therefore, the benefits of using the SSB-OFS as the coherent transmitters are as follows:

i) The complexity of stabilizing the coherent transmitters at their allocated frequencies and the requirement to have a WMU with its electrical and/or optical control interfaces is eliminated.

ii) As each Optical Frequency Shifted 'Coherent' transmitter (OFSCTx) is not separately controlled, systems can be designed to operate at the theoretical channel spacing limit, thus allowing maximum channel packing. This is because as each OFSCTx is derived from a single master laser there is now no need to allow for guard bands, usually required to allow for frequency stabilization inaccuracies.

iii) Start-up times would also be dramatically reduced to several milliseconds—the time required for the electrical RF sources to stabilize.

If the simplification is applied to the coherent receiver of such coherent based optical switch systems they would have significant advantages over traditionally coherent based switches. The complexity of maintaining the inter-channel separation between channels is eliminated. Channel switching speeds and hence switch reconfiguration speeds could be in the order of nanoseconds. (Coherent systems will be limited to milliseconds due to the thermal under/over shoot problems encountered as the bias current/s are changed in single and multi-second lasers—thermal correction required when the laser's bias current/s are changed takes several milliseconds causing an increase in channel lock times). The simple control algorithm in the receiver makes the channel selection procedure very fast and precise, as there is no need to do any lengthy computer based calculations to determine the new laser operating conditions.

Even for very large systems the use of concatenated SSB-OFSs to extended the tuning range of the EFT LO could be used, eliminating the need for multi-section lasers.

Distributed Coherent Switches, where the coherent transistor and receiver are co-located, is one case where SSB modulators can not impact fully. They could, though, be used to generate the optical reference comb required by the coherent transmitters. This is because in this type of coherent switch each coherent transceiver is connected to a PON in the form of a star. Although, inserting the master laser to supply an optical signal to each transceiver is straightforward the use of it by the transmitter portion of the coherent transceiver is impractical. The transmitter would be created by frequency shifting the master laser, but because of the cycling effect of the optical signal, i.e. the coherent receiver can detect its own transmitter, and more importantly the transmitter would also see the rest of the transmitter comb, it would frequency shift the master laser and the comb indefinitely, although the cycling transmitter comb would be at a reduced amplitude due to the PON losses. It is therefore impractical to use the laser elimination techniques described within Fully-distributed coherent switch systems unless a separate fibre is used to transport the master laser signal to each transmitter. In this case the same techniques, and hence savings, as in localized coherent based switches can be used.

Figure 10A:
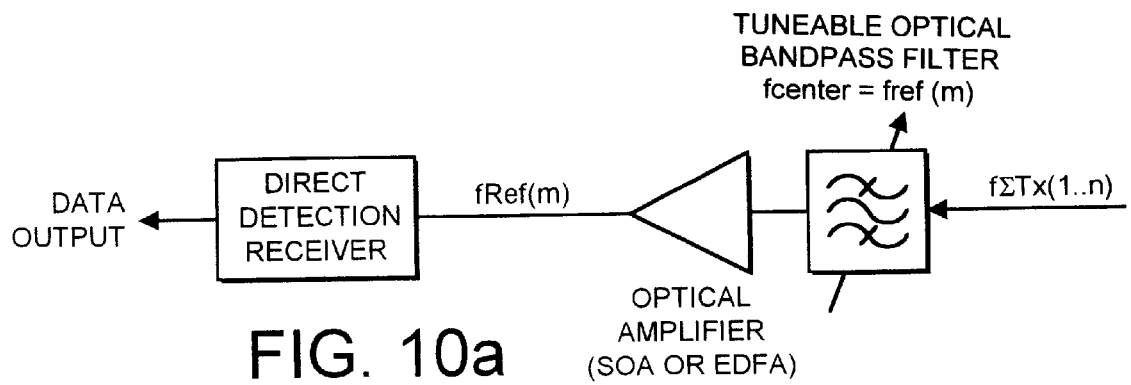
FIG. 10a illustrates the use of an SSB-OFS generated transmitter comb where there is selection of the transmitter signal at the customer terminal.
Figure 10B:
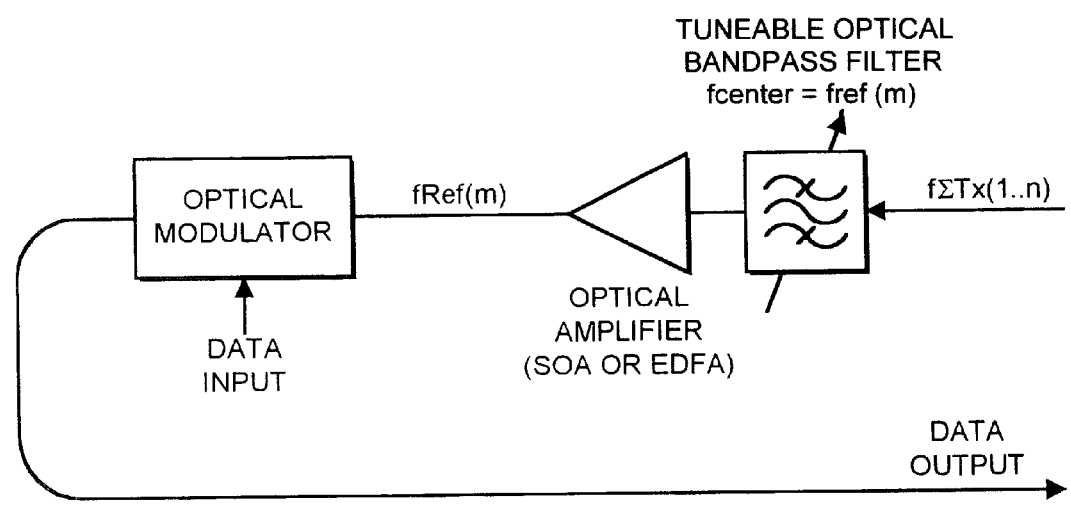
FIG. 10b illustrates the use of an SSB-OFS generated reference comb where selection of one of the reference lines provides the customers transmitted signal.

FIGS. 10a and FIG. 10b show two different uses of the SSB-OFSs. In FIG. 10a a set of SSB-OFSs are used to generate the comb of transmitted signals for a direct detection based distribution system, i.e. Video on Demand (VoD). At the customers premises a tuneable filter followed by an optical amplifier is used to select the required transmitted signal, allowing customer channel selection.

In FIG. 10b, again, a comb is generated using a set of SSB-OFSs. This time, though, the comb is just a 'reference comb'. At the customers terminal a tuneable filter followed by an optical amplifier selects one of the reference lines and passes this signal through an optical modulator. This produces the customer to Head-end data signal. This removes the requirement for an optical source to be present at the customers terminal.

What is claim is:

1. An optical reference frequency generator, comprising: a plurality of single sideband optical frequency shifters (SSB-OFS), the SSB-OFS being connected in pairs, each pair having a common optical frequency input and an optical shift frequency input arranged so that an output from one of the SSB-OFS of each pair has a positive frequency shift and an output from the other of the SSB-OFS of the respective pair has a negative frequency shift.

2. An optical reference comb generator, comprising: an optical reference frequency generator including a plurality of single sideband optical frequency shifters (SSB-OFS), the SSB-OFS being connected in pairs, each pair having a common optical frequency input and an optical shift frequency input arranged so that an output from one of the SSB-OFS of each pair has a positive frequency shift and an output from the other of the SSB-OFS of the respective pair has a negative frequency shift, each output of a respective pair of the SSB-OFS being connected to the inputs of a further pair of the plurality, each further pair having respective optical shift frequency inputs.

3. The optical reference comb generator as claimed in claim 2, wherein each pair of the SSB-OFS has a common optical shift frequency input.

4. The optical reference comb generator as claimed in claim 2, and further comprising identification generating means for adding a reference identity to each optical shift frequency input for final pairs of the SSB-OFS.

5. A coherent receiver having homodyne or heterodyne detection, comprising: a local oscillator constituting an optical reference frequency generator including a plurality of single sideband optical frequency shifters (SSB-OFS), the SSB-OFS being connected in pairs, each pair having a common optical frequency input and an optical shift frequency input arranged so that an output from one of the SSB-OFS of each pair has a positive frequency shift and an output from the other of the SSB-OFS of the respective pair has a negative frequency shift.

* * * * *